April 29, 1969 R. G. WICKER 3,441,871
OSCILLATOR SYSTEM SELECTIVELY OPERABLE AS FREQUENCY MEASURING DEVICE OR AUTOMATIC FREQUENCY CONTROL
Filed Jan. 5, 1968
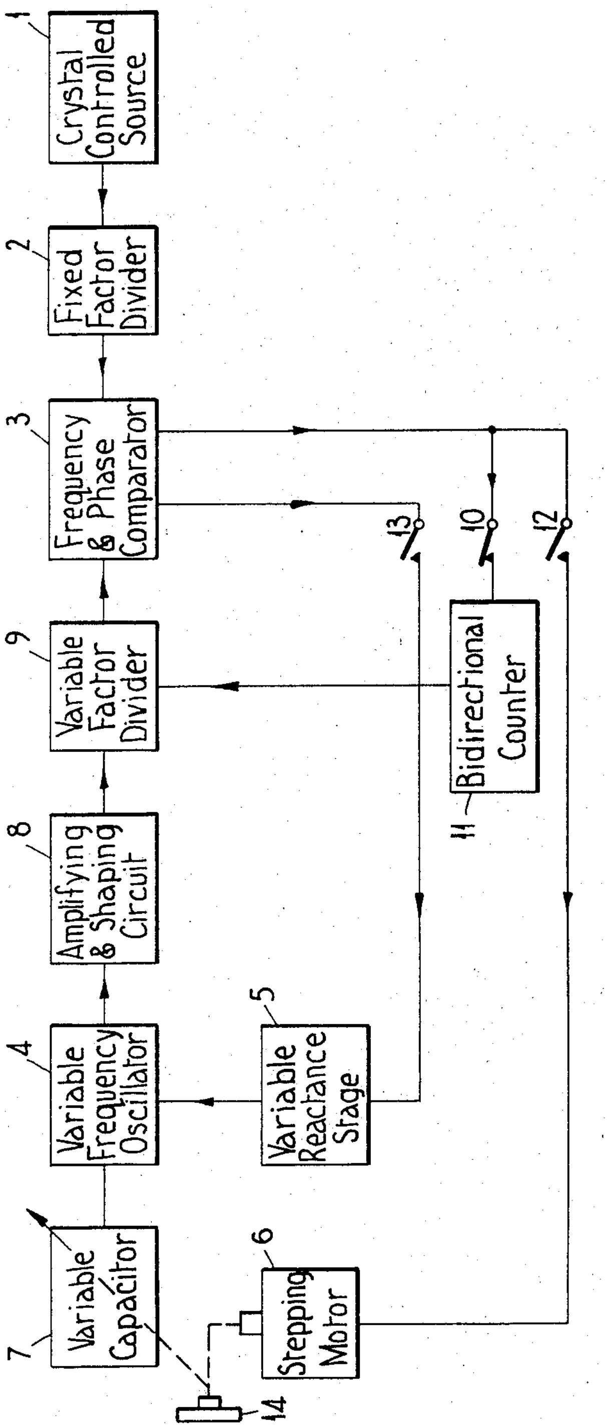
Kirschstein, Kirschstein + Ottinger
ATTORNEYS 3,441,871

OSCILLATOR SYSTEM SELECTIVELY OPERABLE AS FREQUENCY MEASURING DEVICE OR AUTOMATIC FREQUENCY CONTROL

Reginald Gordon Wicker, Coventry, England, assignor to The General Electric Company Limited, London, England, a British company Filed Jan. 5, 1968, Ser. No. 696,089
Claims priority, application Great Britain, Jan. 5, 1967, 697/67
Int. Cl. H03b *3/04, 3/00;* G01r *23/14*
U.S. Cl. 331—11 4 Claims

ABSTRACT OF THE DISCLOSURE

An apparatus for indicating the frequency of a variable frequency oscillator comprising a frequency comparator to one input of which is applied a train of pulses of predetermined frequency and to whose other input is applied a train of pulses at the frequency of the oscillator divided by the division factor of a variable factor divider whose setting is automatically maintained in predetermined relation with the reading of a pulse counter to which the output of the comparator is applied. The stable reading of the counter indicates the frequency of the oscillator. The apparatus can be converted to an automatic frequency control system by disconnecting the comparator output signal from the counter and utilizing this signal to control the oscillator frequency.

This invention relates to apparatus for measuring frequency.

It is an object of the present invention to provide an apparatus of relatively simple form which is capable of indicating the frequency of an electric oscillator with a high degree of accuracy.

According to the present invention an apparatus for indicating the frequency of a variable frequency oscillator comprises a frequency comparator, means for applying to one input of the comparator a train of pulses of predetermined frequency, means for applying to a second input of the comparator a train of pulses whose frequency is substantially equal to the frequency of the oscillator divided by the division factor of a variable factor divider, a pulse counter to which is applied an output of the comparator comprising a train of pulses at a frequency substantially equal to the difference between the frequencies of the train of pulses applied to said inputs of the comparator, and means for automatically controlling the setting of the divider in predetermined relation with the reading of the counter.

In an arrangement in accordance with the invention, for any given frequency of operation of the oscillator, the reading of the counter will change until it attains a value such that the two trains of pulses applied to the comparator are of the same frequency. The setting of the divider is then equal to the frequency of the oscillator divided by the frequency of the train of pulses of predetermined frequency, and the reading of the counter, being in predetermined relation with the setting of the divider gives a measure of the frequency of the oscillator.

The reading of the counter may be arranged to be equal to the setting of the variable divider, or alternatively may be offset by a predetermined amount from the setting of the divider. For example, where the oscillator constitutes the local oscillator of a superheterodyne radio receiver, the reading of the counter may be offset from the setting of the divider by an amount equivalent to the intermediate frequency used in the receiver so that the counter gives a measure of the frequency to which the receiver is tuned rather than the frequency of the oscillator.

In a particular arrangement in accordance with the invention, the apparatus includes means for disconnecting the output of the comparator from the counter, means for setting the reading of the counter at a desired value, and means for utilising the output of the comparator to control the frequency of the oscillator so that the difference between the frequencies f the two trains of pulses tends towards a minimum. With such an arrangement the apparatus may also be used to lock the oscillator to a desired frequency by setting the reading of the counter at the corresponding value.

One apparatus in accordance with the invention will now be described, by way of example, with reference to the accompanying drawing which is a block schematic diagram of the apparatus.

Referring to the drawing the apparatus includes a crystal controlled pulse source 1 whose output is applied to a fixed factor frequency divider 2 to provide a train of pulses having a frequency of 100 cycles per second which is fed to one input of a frequency and phase comparator 3.

The apparatus also includes a variable frequency LC oscillator 4 whose frequency is arranged to be varied manually, and also automatically as described in greater detail below, by means of a fine frequency control means comprising a voltage controlled reactance stage 5 incorporated in a frequency determining circuit of the oscillator 4, and a coarse frequency control means comprising an electric stepping motor 6 coupled to a variable capacitance 7 incorporated in the frequency determining circuit of the oscillator 4.

The output of the oscillator 4 is fed via an amplifying and shaping circuit 8 to a variable factor frequency divider 9 whose output is fed to the other input of the comparator 3.

The comparator 3 provides a first output comprising a train of pulses having a frequency equal to the difference between the frequencies of its two outputs, this output appearing at one or the other of two terminals (not shown) in dependence on the sense of the difference in frequency, and a second output in the form of a unidirectional voltage whose magnitude is representative of the phase difference between the two inputs when the inputs are of the same frequency.

The frequency responsive output of the comparator 3 is applied via an on-off switch 10 to a bidirectional pulse counter 11 so that the direction of counting depends on which of the two inputs to the comparator 3 is of higher frequency, the number stored in the counter 11 increasing when the input fed to the comparator 3 from the variable factor divider 9 is of higher frequency than the other input and vice versa. The counter 11 is arranged to give a visual indication in decimal form of the number stored therein. The counter 11 is coupled to the variable factor divider 9 so that the setting of the divider 9, that is the factor by which it divides, is equal to the number stored in the counter 11.

In addition, the frequency responsive output of the comparator 3 is applied via a second on-off switch 12 to the stepping motor 6, and the phase responsive output of the comparator 3 is applied via a third on-off switch 13 to the voltage controlled reactance stage 5.

In a first mode of operation of the apparatus, the switch 10 between the counter 11 and the comparator 3 is closed and the other two switches 12 and 13 are opened. At any setting of the frequency of the oscillator 4 by means of a knob 14 coupled to the variable capacitor 7, pulses will be applied to the counter 11 to cause the number stored in the counter 11 to change in one sense or the other until the frequency of the input fed to the comparator 3 from the variable factor divider 9 is equal to the frequency of the other input to the comparator 3, that is 100 c./s. In this condition, the setting of the variable divider 9, and hence of the reading of the counter 11, is equal to the frequency of the oscillator 4 divided by 100. Hence, the reading of the counter 11 indicates the frequency of the oscillator 4, and will change with the frequency of the oscillator 4 as this frequency is manually varied by means of the knob 14.

In a second mode of operation of the apparatus, the switch 10 connecting the counter 11 to the comparator 3 is opened, and the other two switches 12 and 13 are closed, When the counter 11 is set to any number representative of a desired frequency of the oscillator 4, the frequency controlled output of the comparator 3 causes the stepping motor 6 to operate until the frequency of the oscillator 4 is approximately equal to the desired frequency, whereupon the phase responsive output of the comparator 3 captures control of the oscillator frequency. The oscillator 4 may thus be accurately tuned to a desired frequency by setting the counter 11 to the appropriate number, and by means of the outputs of the comparator 3, is stabilised at the chosen frequency in phase and frequency against the output of the pulse source 1.

In a modified form of the arrangement described, the reading of the counter 11 may be arranged to be offset by a desired amount from the setting of the variable divider 9. For example, where the oscillator 4 is serving as the local oscillator of a superheterodyne receiver, the reading of the counter 11 may be offset from the setting of the divider 9 by an amount corresponding to the intermediate frequency of the receiver.

In a further modified form of the arrangement described, means may be incorporated in the apparatus to speed up changes in the reading of the counter with changes in the frequency of the oscillator when the apparatus is operating in the first mode.

I claim:

1. An apparatus for indicating the frequency of a variable frequency oscillator comprising: a pulse source which produces a first train of pulses at a predetermined frequency; means incorporating a variable factor divider which produces a second train of pulses at a frequency equal to the frequency of the oscillator divided by the division factor of the variable factor divider; a frequency comparator having first and second inputs, to which said first and second trains of pulses are respectively applied, and an output at which appears a train of pulses whose frequency is equal to the frequency difference between the trains of pulses applied to said inputs of the comparator; a pulse counter which is connected to said output of the comparator; and means for automatically maintaining the setting of said divider in predetermined relation with the reading of said counter.

2. An apparatus according to claim 1 wherein said counter is a bidirectional counter.

3. An apparatus according to claim 1 including switch means for disconnecting the output of the comparator from the counter; means for utilising the output of the comparator to control the frequency of the oscillator in such a manner that the difference between the frequencies of said first and second trains of pulses tends to zero, and control means for setting the reading of the counter at a desired value.

4. An apparatus according to claim 3 wherein said oscillator incorporates a coarse frequency control means and a fine frequency control means and said comparator produces a first output which is indicative of the frequency difference between said first and second trains of pulses and is utilised to control said coarse frequency control means, and a second output which is indicative of the phase difference between said first and second trains of pulses and is utilised to control said fine frequency control means.

References Cited

UNITED STATES PATENTS

| | | | |
|---|---|---|---|
| 3,164,777 | 1/1965 | Guanella ---------- | 331—18 X |
| 3,375,448 | 3/1968 | Newman et al. ------ | 331—18 X |

JOHN KOMINSKI, *Primary Examiner.*

S. H. GRIMM, *Assistant Examiner.*

U.S. Cl. X.R.

324—79, 82, 85; 331—13, 18, 25, 44